Oct. 15, 1968 O. D. GRANDSTAFF 3,406,262
SIGNALING ARRANGEMENTS CONTROLLED BY LINE RINGING CURRENT
Filed Feb. 23, 1965
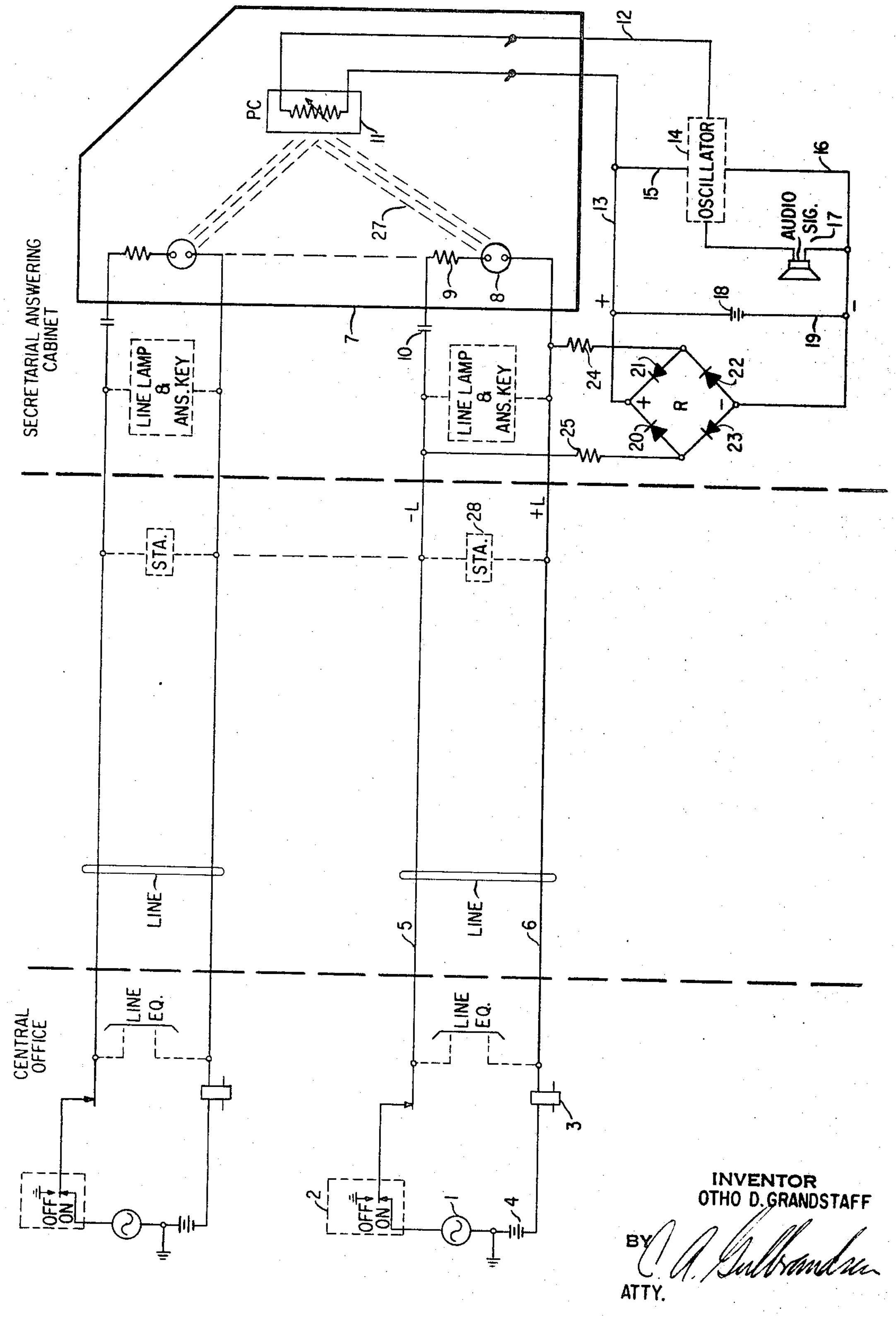
INVENTOR
OTHO D. GRANDSTAFF
BY C. A. Gulbrandsen
ATTY.

United States Patent Office 3,406,262

Patented Oct. 15, 1968

3,406,262

SIGNALING ARRANGEMENTS CONTROLLED BY LINE RINGING CURRENT

Otho D. Grandstaff, Oak Park, Ill., assignor to Automatic Electric Laboratories, Inc., Northlake, Ill., a corporation of Delaware Filed Feb. 23, 1965, Ser. No. 434,383

3 Claims. (Cl. 179—84)

ABSTRACT OF THE DISCLOSURE

A secretarial answering cabinet having a plurality of telephone subscriber lines terminating therein, and having a photocell positioned in an enclosure with a plurality of neon lamps. Each of the lamps is connected in series with a resistor and a capacitor across a different one of the subscriber lines, whereby ringing current transmitted over a calling one of the lines causes the associated lamp to emit light, which causes the photocell to effectively turn on an oscillator for producing an audible signal as an indication of an incoming call to the cabinet. In this manner, incoming ringing signals are isolated from the audible signal and the individual resistor/capacitor combination prevents false operation of the lamp associated therewith during operation of the dial when an outgoing call from the corresponding subscriber station is initiated.

This invention relates to improvements in signaling systems, but it is more particularly concerned with improvements in signaling arrangements for telephone system answering facilities serving one or more telephone lines. The facility may be a secretarial answering cabinet having arrangements by which an attendant answers central office telephone calls which would normally be answered at station subsets connected to the lines.

To illustrate, a typical secretarial answering key cabinet arranged for this service is disclosed in Patent 2,541,336 issued to B. A. Carroll on Feb. 13, 1951. The cabinet includes an arrangement of linelamps and answer keys individually connected to different ones of a plurality of central office telephone lines, and between the keys there are provided interconnections enabling an attendant to answer any of the calling lines from her substation set. The attendant is signaled visually on each line call by the lighting of corresponding line lamps responding to ringing current, and furthermore she may be audibly signaled by one of the alternative arrangements described in the patent. For instance, this could be individual line ringers or other types of individual audible signaling equipment responsive to ringing on the line.

While the above-mentioned line ringer arrangements would provide audible signals, it was found preferable to provide a common audible signaling device. In this circuit, tone signals were generated by a common relay-type buzzer at the answering cabinet and the buzzer responded to the ringing current received by way of an associated three-element gas tube triggered into conduction by line ringing. Although the latter signaling arrangement was generally satisfactory, space requirements of the tubes became a problem in designs of attendant cabinets with larger capacities. The arrangement was also subject to operating difficulties arising from non-functioning of some tubes if ringing voltage was subnormal; and the circuit provided no means for controlling audibility of the buzzer, as was sometimes necessary because of surrounding noise conditions. In another previously proposed arrangement, an attempt was made to avoid problems by providing a ringing-current powered electronic tone ringer in which a common oscillator is connected through individual diodes between one side of the various lines and ground. This arrangement was the cause of other objections, such as: crosstalk coupling between lines through the diodes; ring cutoff relays in the central office circuits were sometimes prematurely operated from diode rectified currents if several cabinets were connected in multiple; cabinet strapping differed for battery and ground connected ringing generator offices with the result that lines with differing ringing modes could not be served by the same cabinet; and operation of the signaling circuit depended upon the cabinet having a ground wire connection.

The principal object of this invention is therefore to provide an improved arrangement avoiding some or all of the above disadvantages.

Another object of this invention is to provide such an improved arrangement for operation from a plurality of lines.

It is a further object of this invention to provide an improved signaling circuit of this kind for telephone systems having the above-mentioned secretarial answering key type cabinets.

It is a feature of this invention to provide an arrangement wherein radiation, for example, light is used for electrically isolating the audible signaling circuit from the line conductors of the subscriber lines over which the ringing current is received.

According to another feature of this invention, the audible signaling circuit responds through the medium of a radiation path, to detected on-off line signaling conditions caused by corresponding on-off periods of ringing current on the line conductors.

As a further feature of the invention, each incoming subscriber line to the signaling arrangement includes connections whereby a glow tube normally provides an open circuit path between line conductors but breaks down, in response to applied line ringing potentials, to produce radiations of light at the tube electrodes.

Another feature of this invention is in the relative mounting relationship between a number of the above-mentioned tubes and a common light detector whereby the audible signaling circuit is turned on while the detector detects light emanating from any of the tubes.

In the embodiment of the invention disclosed herein, the glow tubes are neon-lamps relatively positioned in an enclosure with respect to a photocell detector such that only light from the lamps enables the photocell to start the audible signaling in response to a lowered resistance of its conductive element.

According to another feature of this invention, there is provided a re-chargeable storage battery for powering the audible signaling circuit and the battery is recharged from the central office battery by way of circuit connections established therewith over line conductors of one of the incoming subscriber lines.

As a further feature of this invention, the circuit connections of the rechargeable storage battery with the line conductors extending from battery at the central office include rectifier means for insuring potentials of the proper polarity for charging the storage battery regardless of the polarity present on the line conductors from the central office battery.

Another feature of this invention relates to the audible signaling circuit arrangement wherein an oscillator, actuated upon lowering of the resistance of the photocell element is caused to drive the audio signaling unit for as long as light from any neon lamp is detected by the photocell. In the preferred embodiment of this invention, the oscillator could be a standard code practice circuit adapted for the audible signaling arrangement as used in this invention. For instance, a code practice oscillator circuit of a type similar to that shown in FIGURE 15.6, Section 15, 7th edition of General Electric Company's Transistor Manual may be used. Preferably this circuit obviously provides means for varying output tone signals as would be desirable in the present audible signaling arrangement.

A further feature of the invention relates to a circuit arrangement wherein the neon lamp of each subscriber line insures a balanced line with high impedance conditions at all times, and wherein a resistor-capacitor combination serially connected in the lamp path blocks undesirable effects from dial surges as the station establishes outgoing calls. This combination also enables the lamp to operate without D.C. bias from the line.

A still further feature of the invention relates to the improved signaling arrangement wherein operations of the audible signaling circuit are not dependent on connections with ground.

Other objects and features of this invention will become apparent from a perusal of the detailed description which follows. Illustrating one embodiment of the present invention is a single drawing figure showing circuit connections of the signaling system in schematic form.

The right hand portion of the figure generally shows a secretarial answering cabinet arrangement, which is connected over line conductors to central office equipment appearing on the left hand portion of the drawing. The latter typically shows telephone system equipment employed in establishing calls from the central office to stations on the lines. As mentioned above, these station calls may be supervised and answered by the cabinet attendant by means of lamp and by key arrangements, such as disclosed in Patent 2,541,336 issued to B. A. Carroll.

The central office equipment of the figure may be regarded as common to all the subscriber lines and taken into use on calls to the subscriber stations. This equipment comprises a ringing current generator 1; ringing current interrupter apparatus 2, for applying on-off periods of ringing current to the lines; a ring trip relay 3, which is operated to cut off the line ringing when a call is answered; and a central office battery 4, which is customarily connected to the lines by way of switching equipment, not shown.

Referring now to the remainder of the figure, the following description relates to the embodiment of this invention wherein the audible signaling circuit at the secretarial answering cabinet operates in response to receipt of ringing current when the above-mentioned ringing current is applied to a typical subscriber line comprising conductors 5 and 6 for calling subscriber station 28 on that line. The attendant is made aware of this station call by lighting of the line lamp, not shown, at her cabinet, or by the improved audible signaling circuit of this invention under control of the ringing current flowing over line conductor extensions —L and +L connected in series to capacitor 10, resistor 9, and glow tube 8. The tube has a pair of electrodes, as in neon lamps often used as line lamps. These lamps provide a high impedance open circuit path to the line conductor connections with the central office but break down under ringing currents and provide a luminous discharge at their electrodes.

This discharge is shown in the figure as light radiations 27, which activate the photocell 11, which is provided in enclosure 7 together with the neon lamps 8. This arrangement permits the sensitive element of the photocell to be responsive to light from any of the neon lamps and to exclude light from outside sources. Whether the resistor 9 and capacitor 10 are within the enclosure 7 is a design choice and without bearing on operations of this signaling circuit.

As mentioned above, the audible signaling arrangement includes a storage battery 18, for instance, a long life nickel-cadmium battery, for powering the oscillator 14 and the audio signaling unit 17. The latter may advantageously be a telephone receiver for reproducing voice frequency signals at a controlled rate as oscillator

14 closes paths from battery terminal connections 13 and 15 through the receiver to the other battery terminal 19.

The oscillator 14 is connected, as clearly shown in the drawing, to the storage battery 18 by way of conductors 15 and 16, and it also has a path extending over conductor 12 through the sensitive element of the photocell 11 to battery conductor 13 whereby the element, in its lowered resistance condition, is the medium for operating oscillator 14 to drive the telephone receiver 17 as long as the photocell 11 detects the light radiations 27.

The storage battery 18 is maintained in a charged condition by means of a network of rectifiers 20, 21, 22 and 23 having connections through resistors 24 and 25 to the above-mentioned line conductors 5 and 6 extending to the central office battery 4. The rectifiers have obvious poled connections permitting charging of the battery 18 irrespective of the polarity changes occurring on the line for supervisory purposes, as used in telephone systems.

From what has been said above, it will be understood that an improved audible signaling arrangement results by electrically isolating the signaling circuit from the line conductors over which ringing signals are received. Therefore, it will be clear that this signaling medium provides no coupling or feed-back arrangement from the signaling circuit for adversely affecting the line operations. It will also be found that simple adjustments of variable components in the oscillator will permit audible signaling, both as to frequency and tone level, as desired by the attendant.

Having fully described the features and aspects of my invention, what I consider to be new will be pointed out in the appended claims.

What is claimed is:

1. In a telephone system having a plurality of subscriber lines: an attendant's station connected to said lines and including a device common to said lines for audibly indicating a ringing condition existing on any of said lines; a plurality of glow tubes, each having a pair of electrodes, connected to different ones of said lines; each of said tubes normally providing an open circuit path between the pair of electrodes associated therewith, but breaking down in response to ringing current being applied to the corresponding line for producing a luminous discharge between said associated pair of electrodes; an oscillator connected to said device; a light detector, common to and disposed in close proximity to said plurality of glow tubes, and at all times conditioned to respond to the luminous discharge emanating from any of said tubes for controlling said oscillator to operate said device.

2. An attendant's station in a telephone system in accordance with claim 1 and wherein said plurality of subscriber lines are connected to a central office battery; said station further including a rechargeable battery for powering said oscillator, and circuit connections extending from one of said subscriber lines to said rechargeable battery to charge said rechargeable battery from said central office battery.

3. An attendant's station in a telephone system in accordance with claim 2; wherein said circuit connections include rectifying means for maintaining the charging potential for said rechargeable battery at a predetermined polarity regardless of the polarity of the connection of said one line to said central office battery.

References Cited

UNITED STATES PATENTS

| | | | |
|---|---|---|---|
| 1,758,056 | 5/1930 | Niles | 179—84 |
| 2,685,614 | 8/1954 | Curtin | 179—27.25 |
| 3,037,086 | 5/1962 | Abbott et al. | 179—84 XR |
| 3,104,323 | 9/1963 | Over et al. | 250—209 XR |
| 3,253,153 | 5/1966 | Stoddard | 331—66 XR |

KATHLEEN H. CLAFFY, *Primary Examiner.*

R. LINN, *Assistant Examiner.*